United States Patent
Konnunaho et al.

(10) Patent No.: US 6,603,498 B1
(45) Date of Patent: Aug. 5, 2003

(54) PRINTER HEAD WITH LINEAR ARRAY OF INDIVIDUALLY ADDRESSABLE DIODE-LASERS

(75) Inventors: Tuomo Konnunaho, Tampere (FI); Harry Asonen, Tampere (FI); Arto K. Salokatve, Tampere (FI); Jari Tapani Naeppi, Tampere (FI)

(73) Assignee: Coherent, Inc., Santa Clara, CA (US)

( * ) Notice: Subject to any disclaimer, the term of this patent is extended or adjusted under 35 U.S.C. 154(b) by 136 days.

(21) Appl. No.: 09/724,394

(22) Filed: Nov. 28, 2000

(51) Int. Cl.[7] .................................................. B41J 2/435
(52) U.S. Cl. ........................ 347/236; 347/237; 347/238; 347/246; 347/247
(58) Field of Search ............................ 372/50; 347/236, 347/136, 237, 238, 246, 247; 250/204, 205; 257/88

(56) References Cited

U.S. PATENT DOCUMENTS

| | | |
|---|---|---|
| 4,307,469 A | 12/1981 | Casper et al. |
| 4,445,125 A | 4/1984 | Scifres et al. |
| 4,699,446 A | 10/1987 | Banton et al. |
| 4,793,709 A * | 12/1988 | Jabr et al. .................. 356/445 |
| 4,803,497 A | 2/1989 | Kennedy, Jr. et al. |
| 4,837,428 A | 6/1989 | Takagi et al. |
| 4,887,271 A | 12/1989 | Taylor |
| 4,914,670 A * | 4/1990 | Nishizawa et al. ............ 372/96 |
| 5,043,992 A | 8/1991 | Royer et al. |
| 5,097,476 A | 3/1992 | Thiessen |
| 5,107,362 A * | 4/1992 | Motoshima et al. .......... 359/187 |
| 5,124,281 A | 6/1992 | Ackerman et al. |
| 5,136,152 A | 8/1992 | Lee |
| 5,220,348 A | 6/1993 | D'Aurelio |
| 5,291,221 A | 3/1994 | Sanger et al. |
| 5,321,426 A | 6/1994 | Baek et al. |
| 5,383,208 A | 1/1995 | Queniat et al. |
| 5,422,900 A | 6/1995 | Reele et al. |
| 5,432,537 A | 7/1995 | Imakawa et al. |
| 5,488,619 A | 1/1996 | Injeyan et al. |
| 5,491,046 A | 2/1996 | DeBoer et al. |
| 5,497,391 A | 3/1996 | Paoli |
| 5,500,869 A | 3/1996 | Yoshida et al. |
| 5,534,950 A | 7/1996 | Hargis et al. |
| 5,608,747 A | 3/1997 | Baek et al. |
| 5,638,390 A | 6/1997 | Gilliland et al. |
| 5,680,385 A | 10/1997 | Nagano |
| 5,713,654 A | 2/1998 | Scifres |
| 5,784,091 A | 7/1998 | Ema et al. |
| 5,815,484 A * | 9/1998 | Smith et al. .............. 369/275.1 |
| 5,821,527 A | 10/1998 | Rudd et al. |
| 5,922,502 A | 7/1999 | Damme et al. |

(List continued on next page.)

FOREIGN PATENT DOCUMENTS

| | | | |
|---|---|---|---|
| EP | 0 310 266 | 9/1988 | .......... G06K/15/12 |
| WO | WO 00/49691 | 8/2000 | ............. H01S/5/40 |

*Primary Examiner*—Lamson Nguyen
*Assistant Examiner*—Lam Nguyen
(74) *Attorney, Agent, or Firm*—Stallman & Pollock LLP

(57) ABSTRACT

A printer head for computer-to-plate printing includes a linear array of individually addressable diode-lasers and a linear array of photodetectors. The number and spacing of the photodetectors is the same as the number and spacing of the diode-lasers. The diode-lasers emit in forward and reverse directions. The diode-lasers and photodetectors are aligned parallel to each other such that reverse-emitted light output of each diode-laser is incident on a corresponding photodetector. Each photodetector output is monitored by a dedicated controller/driver sub-circuit that regulates drive current supplied to the diode-laser. The drive current is regulated according to a comparison of the monitored photodetector output with a reference current individually calibrated in each sub-circuit. Calibration data for each sub-circuit is obtained from a measurement of forward-emitted output power of its corresponding diode-laser compared with a desired target forward-emitted power. The individual calibration of the sub-circuits provides that each of the diode-lasers emits at the target output power.

17 Claims, 3 Drawing Sheets

U.S. PATENT DOCUMENTS

| | | |
|---|---|---|
| 5,923,359 A | 7/1999 | Montgomery |
| 5,986,819 A | 11/1999 | Steinblatt |
| 5,990,983 A | 11/1999 | Hargis et al. |
| 6,014,162 A | 1/2000 | Kerr et al. |
| 6,023,485 A | 2/2000 | Claisse et al. ................ 372/50 |
| 6,026,104 A | 2/2000 | Itou |
| 6,049,073 A | 4/2000 | Roddy et al. |
| 6,266,077 B1 * | 7/2001 | Kamimura .................. 347/236 |

* cited by examiner

PRINTER HEAD WITH LINEAR ARRAY OF INDIVIDUALLY ADDRESSABLE DIODE-LASERS

TECHNICAL FIELD OF THE INVENTION

The present invention relates in general to diode-laser printing. The invention relates in particular to diode-laser writing of data directly onto printing plates having a thermally sensitive organic coating for receiving the written data

DISCUSSION OF BACKGROUND ART

Preparation of printing plates directly from computer generated data has been facilitated by the development of printing plate blanks comprising a metal base, typically aluminum, having a coating including a layer of a thermally-sensitive organic material. Such plates are often referred to by practitioners of the art as thermal plates. The organic material is formulated to undergo a change of state or conversion on exposure to thermal energy. This allows the computer generated data to be written directly into the layer of organic material. Printing ink adheres preferentially to the converted material. This direct writing avoids the process steps and chemicals required in printing plate preparation by photoresist exposure, development and etching. A semiconductor diode-laser provides a suitable thermal energy source. It is relatively small compared with other laser types, as well as being robust and reliable.

In one common computer-to-plate writing operation, a thermal plate is wrapped around a drum or cylinder. Data is written into the thermal plate, one line at a time, rotating the drum at the end of each line to expose an area of the plate on which to write the next line. Data is written on a line, one half-tone dot at a time, by exposing the organic material of the thermal plate to radiation emitted by a diode-laser. The diode-laser is switched on to begin writing a dot and switched off after a dot is written. Switching the diode-laser rapidly on and off for writing the data is accomplished by modulating current supplied to the diode-laser.

In computer-to-plate printers using a such a diode-laser, printing speed for any given thermally sensitive organic material is limited primarily by the amount of power emitted by the diode-laser. The faster the diode-laser is moved to speed up writing a line of data, the higher must be the modulation rate for data writing. The laser output-power must be correspondingly increased in order to maintain a minimum (threshold) thermal energy required for thermal conversion.

One possible approach to improving printing speed would be to use one or more linear-arrays of individually addressable diode-lasers (diode-laser bars). One problem, however, is that manufacturing tolerances in diode-laser bar preparation are typically insufficient to provide that each emitter in the bar has the same output power for a given input current. This could cause inconsistencies in the printed data. Further, individual diode-lasers (emitters) in such a linear array would need to be tightly packed to provide adequate quality of printed data, for example, spaced apart by about 200 micrometers ($\mu$m). Each diode-laser can emit as much as 200 milliwatts (mW) of power in a single mode. Such tight packing and high output power of diode-lasers could cause optical and thermal cross-talk between diode-lasers such that the operation of one diode-laser can influence the operation of an adjacent one or more diode-lasers in the bar. This could exacerbate any manufacturing differences between diode-lasers in a bar, possibly even leading to data omission as a result of the output of an individual diode-laser falling below threshold energy for thermal conversion.

There is a need for a diode-laser bar arrangement which overcomes these problems, thereby facilitating the use of an array of individually addressable diode-lasers in writing data directly to a printing plate.

SUMMARY OF THE INVENTION

The present invention is directed to a printing head for writing data into a thermally sensitive medium. In one aspect, the invention comprises a diode-laser bar including a plurality of diode-lasers spaced-apart in a linear array. Each of the diode-lasers emits light in forward and reverse directions. A plurality of photodetectors is provided. The photodetectors are spaced apart in integrated linear array thereof corresponding in number and spacing to the plurality of diode-lasers. The photodetectors are arranged such that each thereof receives reverse-emitted light from a corresponding one of the diode-lasers. The inventive printing head further includes an application-specific integrated circuit (ASIC). The ASIC is arranged to individually monitor output of each of the photodetectors in response to the reverse-emitted light received thereby. Based on the monitored photodetector outputs, the ASIC supplies individual drive currents to each of the diode lasers such that all of the diode-lasers emit a predetermined target output power in the forward direction, the target power being the same for all of the diode-lasers.

In one preferred embodiment of the inventive printer head, the ASIC includes a plurality of sub-circuits. Each of the sub-circuits is in electronic communication with a corresponding one of the photodetectors for monitoring the output thereof, and with the corresponding diode-laser for supplying the individual drive current thereto. Each of the sub-circuits is supplied with a common potential, and each includes a reference current generator individually calibrated by calibration data derived from a particular light-output characteristic of the diode-laser and the target forward-emitted output power. Each of the sub-circuits includes a drive current generator for supplying the individual drive current to the diode-laser. Each of the sub-circuits is arranged to monitor current provided by the photodetector in response to reverse-emitted light received thereby from the diode-laser and to compare the monitored photodetector current with a reference current provided by the calibrated reference current generator. The drive current generator is adjusted, based on the current comparison, such that the individual drive current supplied thereby to the diode-laser causes the diode-laser to emit about the common target output-power in the forward direction.

In one example of the inventive printing head including an array of 50 single-mode diode-lasers, an array of 50 photodiodes (photodetectors) and an ASIC including 50 sub-circuits, all of the diode lasers emitted within ±1% of a nominal (target) output power of 150 mW.

While the present invention is described herein in the context of a printing head for a thermal printing application this should no be construed as limiting the invention. Those skilled in the art will recognize from the above-presented summary and the detailed description set forth below that the invention could find application in other fields, for example, in telecommunications and in diode-laser pumping of solid-state lasers.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
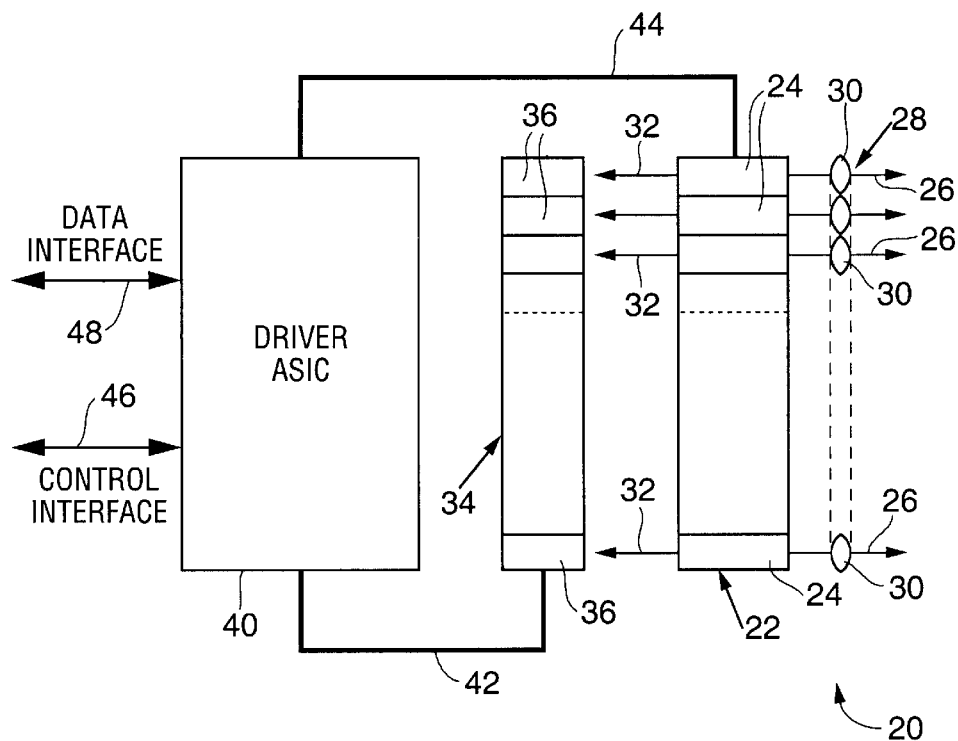
FIG. 1 schematically illustrates interaction and interconnection of components of one preferred embodiment of a printing head in accordance with the present invention including a linear array of diode-lasers, a corresponding array of photodetectors and an application-specific integrated circuit.

Turning now to the drawings, wherein like components are designated by like reference numerals, FIG. 1 schematically illustrates a group 20 of optical and electronic components of a printing head in accordance with the present invention. Component group 20 includes a diode-laser bar 22 including a linear array of diode-lasers (emitters) 24. The diode-lasers are equally spaced along the length of the diode-laser bar. Diode-lasers 24 emit light in a forward direction indicated by arrows 26. The light is preferably emitted in a single longitudinal mode. Forward-emitted light 26 is, of course, used for writing data into thermal plates. Optics 28, here, depicted as an array of microlenses 30 are provided for focussing individual emissions of light 26 onto a thermal plate (not shown). Emitting in a single mode simplifies the design of focussing optics and provides for better focus quality than could be obtained with a multiple mode emission. It should be noted here that the simple focussing optics 28 are merely exemplary. Those skilled in the art may use other optical arrangements without departing from the spirit and scope of the present invention. A knowledge of such optical arrangements is not necessary for understanding principles of the present invention. Accordingly detailed description thereof is not presented herein.

Diode-lasers 24 also emit light in a reverse direction indicated by arrows 32. For any one diode-laser 24, the amount (power) of light emitted in direction 32 is directly and linearly related to the mount of light emitted in direction 26. Accordingly, a measurement of light emitted in direction 32 can provide a reliable indication of power emitted by a diode-laser in forward direction 26.

A linear array 34 of photodetectors 36 is located spaced-apart from diode-laser bar 22 in direction 32. Photodetectors 36 are preferably p-i-n photodetectors (photodiodes). Photodetector array 34 includes the same number of photodetectors as there are diode-lasers in diode-laser bar 22. Spacing of photodetectors 36 is the same as the spacing of diode-lasers. Each photodetector is aligned with a corresponding diode-laser for measuring its output. Diode-laser bar 22 and photodetector array 34 are each integrated arrays in the form of a single "chip" cut from a larger wafer (not shown) including a plurality of such arrays. As the positions of the diode-lasers and photodetectors in the array are lithographically defined, the spacing of diode-lasers can be precisely controlled. This greatly simplifies alignment of the individual diode-lasers with their corresponding photodetectors.

Driving circuits, one thereof for each diode-laser, are formed in a single ASIC 40. ASIC 40 includes an externally-powered current source (driver) and associated control structure for each diode-laser in diode-laser bar 22. ASIC 40 monitors the current delivered by individual photodetectors 36. Individual connections to the photodetectors are not shown in FIG. 1, for simplicity of depiction, but are represented collectively by bold line 42. ASIC 40 delivers drive current, individually, to diode-lasers 24 sufficient to maintain the monitored power output of each at an individually calibrated predetermined, constant level. Individual current supply leads are not shown in FIG. 1, again for simplicity of depiction, but are represented collectively by bold line 44.

ASIC 40 is placed close to diode-laser bar 22 and photodetector array 34 for maximizing the rate at which drive current to diode-lasers 22 can be modulated. Preferably, diode-laser bar 22, photodetector array 34 are separated by about 0.5 millimeters (mm) or less. ASIC 40 is preferably separated from diode-laser bar 22 by less than about 10 mm and most preferably by less than about 5 mm.

A control interface 46 is provided for communicating to ASIC 40 control parameters including a calibration value for each diode-laser (channel). The individual calibration value for each diode laser is determined from an output power measurement (of light 26) of the diode laser and the relationship of that measured power to a desired target or nominal output power. The calibration values are stored in a memory and used to determine the individual current (the on-current) which must be supplied to each diode laser such that each provides about the same (target or nominal) output power of light 26 when the diode-laser is emitting. The calibration values thereby compensate for manufacturing differences between the diode lasers and their corresponding drive circuits.

Also communicated via control interface 46 is a photodiode threshold level (a value which must be exceeded for a photodetector output current to be processed) and an off-current value (current through a diode-laser when the diode-laser is not emitting). The photodetector threshold and the off-current level are common to all channels. ASIC 40 includes registers for storing communicated calibration and control data for access by diode-laser drivers and control circuitry.

A data interface 48 is provided for communicating data to be written. Data is communicated serially in "frames" having a number of (binary) data bits equal to the number of channels (diode-lasers), i.e., one data bit per channel. Each data bit is stored in a register. Also communicated is a high and low-going load signal which indicates on a rising edge thereof when the last bit of a frame has been transmitted. Data is applied simultaneously to driving circuits on a falling edge of the load signal.

Figure 2:
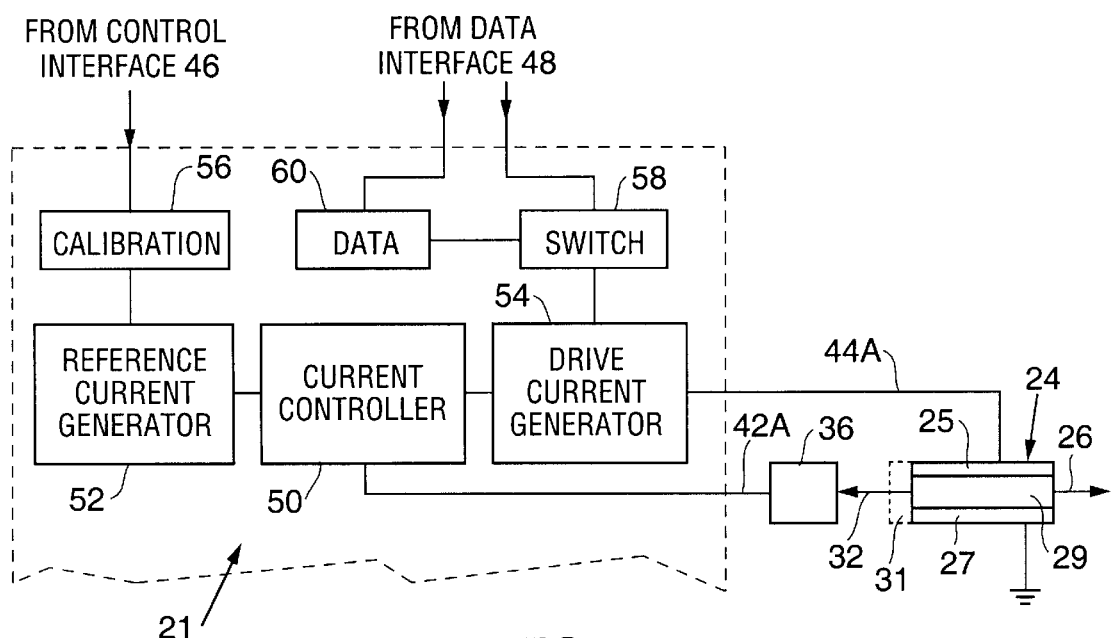
FIG. 2 schematically illustrates one photodetector in the photodetector array of FIG. 2 monitoring light output of one diode-laser in the diode-laser array of FIG. 2 and communicating the monitored output to a current controlled diode-laser driver circuit of the application-specific integrated circuit.

FIG. 2 schematically depicts details of a preferred layout and operation of one current controlled diode-laser driver circuit (sub-circuit) 21 for driving and controlling power output of a diode-laser 24 of diode-laser bar 22. Sub-circuit 21 is depicted for clarity in functional block form. Arrangements of integrated circuit components for providing the functional blocks will be evident to those skilled in the art. Accordingly, such details are not described or depicted herein.

Diode-laser 24 includes a positive contact 25, a ground contact 27 and an emitting region 29 from which forward and backward light beams 26 and 32 are emitted. Diode-laser 24 may optionally be provided with an attenuating coating 31 on a rear facet 33 thereof. This attenuating coating could serve to reduce the power of backward-emitted light 32 incident on photodetector 36 for preventing saturation of the photodiode.

In sub-circuit 21, current controller circuit components 50 compare the current from photodetector 36 (resulting from light 32 incident thereon) with a reference current generated by reference-current generating components 52. Connection between the photodetector and the controller 50 is made via one lead 44A of collective leads 44 (see FIG. 1). The output of current controller 50 is used to regulate current (the on-current) delivered by drive current generating components 54 in accordance with calibration data 56 input to ASIC 40 as discussed above, thereby keeping output power of diode-laser 24 essentially constant at the same predetermined nominal (target) level which is supplied by all other diode-lasers in the array. By way of example, control within ±1.0% of nominal is possible.

As noted above the off-current (sub lasing-threshold current) level is common for all diode lasers 24. Switching of drive current generator from the on-current level to the off current level is accomplished by switching components 58 operated in accordance with data applied from data register 60. Connection between drive current generator 54 and diode-laser 24 is made via one lead 42A of collective leads 42 (see FIG. 1).

It should be noted here that reference current generators 52 and drive current generators 54 and all other circuit components of ASIC 40 are powered by common potentials applied from power supplies (not shown) external to ASIC 40. In one preferred power supply arrangement, there are two power supplies, one for powering the diode-laser current supplies and the other powering control circuits of ASIC 40. The power supplies have a common ground. Provision of such power supplies and their connections will be evident to those skilled in the art, and, accordingly are not depicted in FIGS. 1 and 2 for simplicity of illustration.

Figure 3:
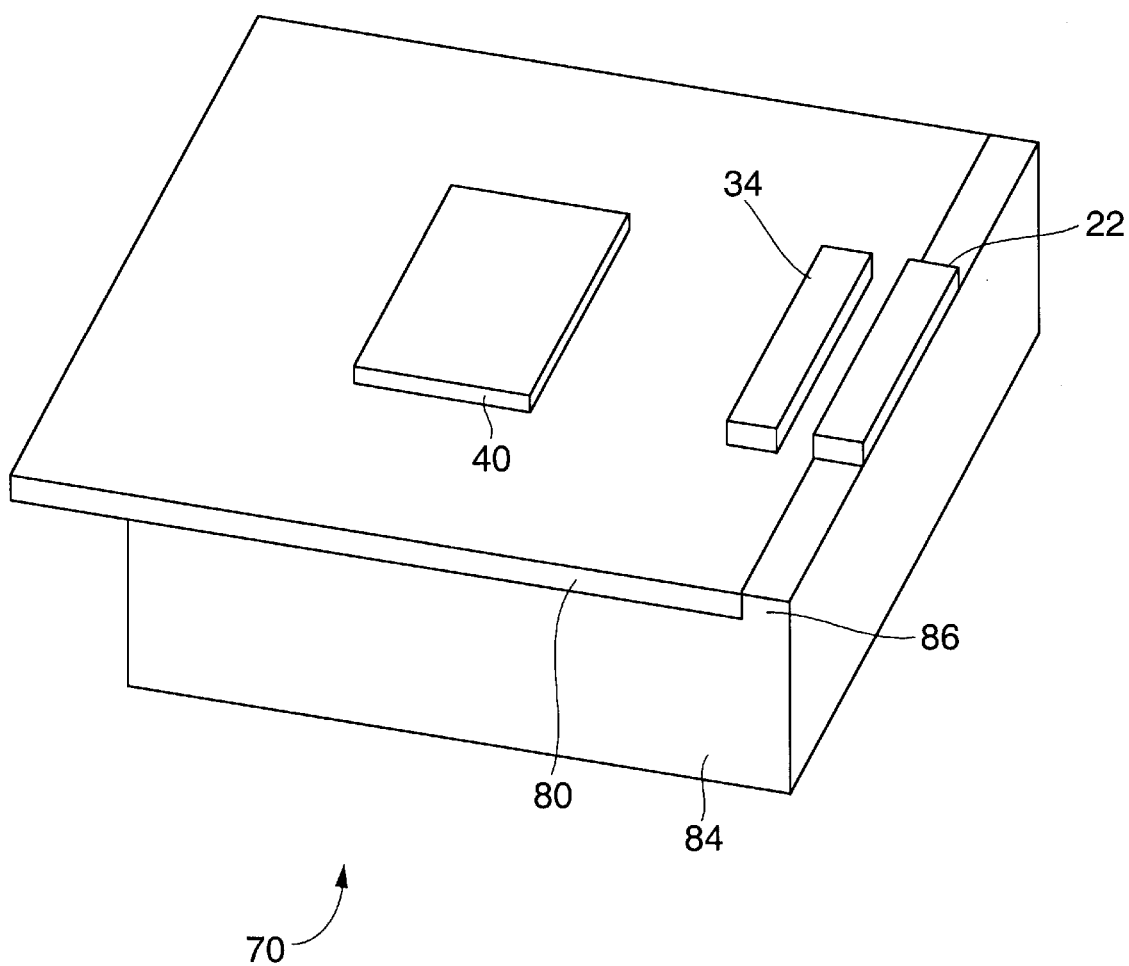
FIG. 3 is a perspective view schematically illustrating a printer head including components of FIG. 1 assembled on a substrate in thermal contact with a heat sink.

FIG. 3, schematically illustrates one embodiment 70 of a printer head assembly in accordance with the present invention. ASIC 40 and photodetector array 30 are mounted on an alumina substrate 80. Substrate 80 is mounted in thermal contact with a copper heat-sink 84. Diode-laser bar 22 is mounted in thermal contact with a lip portion 86 of heat-sink 84. Lip portion 86 has a height selected such that diode-laser bar 22 and photodetector array 30 can be optimally aligned.

ASIC 40 is "flip-chip" bonded to substrate 80. Substrate 80 has evaporated gold traces (not shown) thereon which electrically connect with ASIC 80 at one end thereof. The leads terminate at the other end thereof in bonding pads (not shown) to allow wire connections to be made with the leads. Such wire connections are made between individual diode-lasers in diode laser bar 22 and the evaporated traces. The copper heat-sink 84 provides the system ground.

Figure 4:
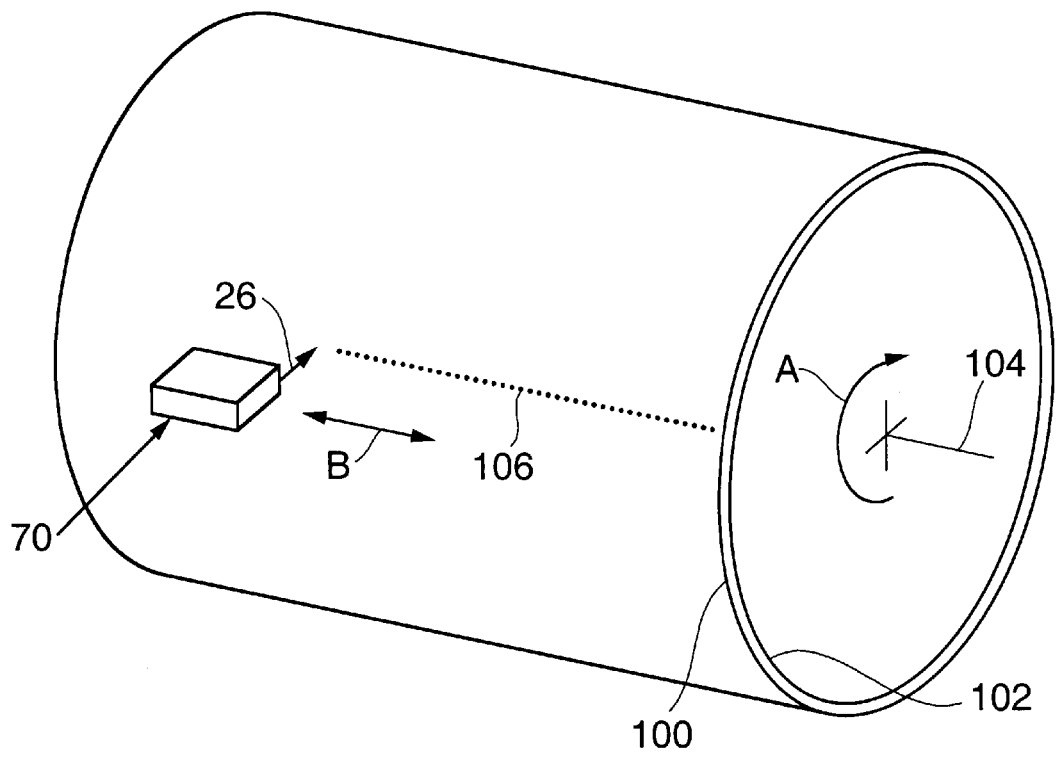
FIG. 4 schematically illustrates the printer head of FIG. 3 arranged to write data on a thermal plate attached to a revolving drum.

Referring now to FIG. 4, printer head 70 is configured to write data on a thermal plate 100 attached to a drum 102. Drum 102 is rotatable about a longitudinal axis 104 thereof as indicated by arrow A. Printer head 60 is arranged with emitters in diode-laser bar 22 thereof (not visible in FIG. 4) aligned parallel to axis 104. Printer head 60 is moved parallel to axis 84, as indicated by arrows B, for writing a line of data 106 on thermal plate 102. After a line of data is written, drum 102 is rotated to allow another line of data to be written on an unexposed portion of thermal plate 100.

In one example of printer head 70, diode-laser bar 22 includes 50 diode-lasers 24. Correspondingly, photodetector array 34 includes 50 photodetectors 36 and ASIC 40 includes 50 sub-circuits 21. The diode-lasers and photodetectors are spaced apart by about 200 μm. The array has a length of about 10 mm. Photodetector array 34 is spaced apart from diode-laser bar 22 by about 0.5 mm. ASIC 40 is spaced at about 3 mm from photodetector array 34.

Diode-lasers 24 are semiconductor heterostructures having an emission wavelength of about 808 nm. Each diode-laser 24 has a nominal output power (light 26) of about 150 mW, single mode, for a nominal drive current of about 300 mA. ASIC 40 is designed to operate at a nominal data clock rate of 50.0 MHz providing a frame rate of 1.0 MHz. Control circuitry is capable of correcting variations in output power of ±30% to within ±0.5% of the nominal value. The control circuitry and its proximity to the diode-lasers and photodetectors allows diode-laser current to each channel to be individually modulated (between on-current and off-current) at a rate of 1.0 MHz.

The present invention has been described in terms of a preferred and other embodiments. The invention is not limited, however, to the embodiments described and depicted. Rather the invention is limited only by the claims appended hereto.

What is claimed is:

1. A diode-laser array module, comprising:

a diode-laser bar including a plurality of diode-lasers spaced-apart in a linear array, each of said diode-lasers emitting light in a forward and a reverse direction;

a plurality of photodetectors spaced apart in an integrated linear array, said plurality of photodetectors corresponding in number and spacing to said plurality of diode-lasers and arranged such that each thereof receives reverse-emitted light from a corresponding one of said diode-lasers;

an application-specific integrated circuit, said application-specific integrated circuit being arranged to individually monitor output of each of said photodetectors in response to said reverse-emitted light received thereby and, based on said monitored photodetector outputs, supply individual drive currents to each of said diode-lasers such that each of said diode-lasers emits a selected output power in the forward direction; and wherein said application-specific integrated circuit is arranged to modulate said drive currents supplied to said diode-lasers at a modulation rate, and wherein said application-specific integrated circuit is spaced apart from said photodetector array by less than about 10 millimeters.

2. The diode-laser array module of claim 1, wherein said selected output power is about the same for each of said diode-lasers.

3. The diode-laser array module of claim 1, wherein said individual drive currents are generated according to said monitored photodetector outputs and electronically stored calibration data characteristic of each of said diode-lasers.

4. The diode-laser array module of claim 1, wherein said application-specific integrated circuit further includes a data interface for receiving data to be printed.

5. The diode-laser array module of claim 4, wherein said application-specific integrated circuit is arranged to individually switch said diode-lasers on and off in response to said printing data received thereby.

6. The diode-laser array module of claim 1, wherein said application-specific integrated circuit includes a plurality of sub-circuits each one thereof in electronic communication with a corresponding one of said photodetectors for monitoring said output thereof and with said diode-laser for supplying said drive currents thereto.

7. The diode-laser array module of claim 6, wherein each of said sub-circuits includes a reference current generator individually calibrated by calibration data derived from a particular light-output characteristic of the diode-laser and said target forward-emitted output power, and a drive current generator for supplying said drive current to said diode-laser, and wherein each of said sub-circuits is arranged to monitor current provided by the photodetector in response to reverse-emitted light received thereby from the diode-laser, compare the monitored photodetector current with a reference current provided by said reference current generator and, from said current comparison, adjust said drive current generator such that a first current supplied thereby to the diode-laser causes the diode-laser to emit about said common target output-power in the forward direction.

8. The diode-laser array module of claim 1, wherein said application-specific integrated circuit, said diode-laser bar and said photodetector array are positioned with respect to each other for maximizing the rate at which said drive currents can be modulated.

9. A diode-laser array module, comprising:

a diode-laser bar including a plurality of diode-lasers spaced-apart in a linear array, each of said diode-lasers emitting light in a forward and a reverse direction and each of said diode-lasers emitting said light in a single mode;

a plurality of photodetectors spaced apart in integrated linear array, said plurality of photodetectors corresponding in number and spacing to said plurality of diode-lasers and arranged such that each thereof receives reverse-emitted light from a corresponding one of said diode-lasers;

an application-specific integrated circuit, said integrated circuit including a plurality of sub-circuits each one thereof in electronic communication with a corresponding one of said photodetectors and said diode-lasers, each one thereof including a reference current generator individually calibrated by calibration data characteristic of said corresponding diode-laser and a desired nominal output power required to be delivered by all said diode lasers, and a drive current generator for supplying drive current to said corresponding diode-laser;

wherein each of said sub-circuits is arranged to monitor current provided by the photodetector in response to reverse-emitted light received thereby from the diode-laser, compare the monitored photodetector current with a reference current provided by said reference current generator and, from said current comparison, adjust said drive current generator such that a first current supplied thereby to the diode-laser causes the diode-laser to emit about said nominal output-power in the forward direction; and wherein said application-specific integrated circuit is spaced apart from said photodetector array by less than about 10 millimeters.

10. The diode-laser array module of claim 9, wherein said application-specific integrated circuit includes a control interface for receiving said calibration data for said reference current generators from an external source thereof.

11. The diode-laser array module of claim 10 wherein said application-specific integrated circuit includes registers for storing said received calibration data.

12. The diode-laser array module of claim 9, wherein each of said sub-circuits is further arranged to switch said corresponding diode-laser on and off in response to electronic printing data supplied from an external source thereof.

13. The diode-laser array module of claim 12, wherein said application-specific integrated circuit includes a data interface for receiving said printing data from said external source thereof.

14. The diode-laser array module of claim 13, wherein said application-specific integrated circuit includes registers for temporarily storing said received printing data.

15. A diode-laser array module, comprising:

a diode-laser bar including a plurality of diode-lasers spaced-apart in a linear array, each of said diode-lasers emitting light in a forward and a reverse direction a plurality of photodetectors spaced apart in integrated linear array, said plurality of photodetectors corresponding in number and spacing to said plurality of diode-lasers and arranged such that each thereof receives reverse-emitted light from a corresponding one of said diode-lasers;

an application-specific integrated circuit, said application-specific integrated circuit being spaced apart from said photodetector array by less than about 10 millimeters and said integrated circuit including a plurality of sub-circuits each one thereof in electronic communication with a corresponding one of said photodetectors and said diode-lasers, each one thereof including a reference current generator individually calibrated by calibration data characteristic of said corresponding diode-laser and a desired nominal output power required to be delivered by all said diode lasers, and a drive current generator for supplying drive current to said corresponding diode-laser;

wherein each of said sub-circuits is arranged to monitor current provided by the photodetector in response to reverse-emitted light received thereby from the diode-laser, compare the monitored photodetector current with a reference current provided by said reference current generator and, from said current comparison, adjust said drive current generator such that a first current supplied thereby to the diode-laser causes the diode-laser to emit about said nominal output-power in the forward direction; and wherein an attenuator is located between each of said diode-lasers and each of said photodetectors for reducing the level of said reverse-emitted light received by said photodetectors for preventing saturation thereof by said reverse-emitted light.

16. A diode-laser array module, comprising:

a diode-laser bar including a plurality of diode-lasers spaced-apart in a linear array, each of said diode-lasers emitting light at a wavelength of about 808 nm in a forward and a reverse direction and a plurality of photodetectors spaced apart in integrated linear array, said plurality of photodetectors corresponding in number and spacing to said plurality of diode-lasers and arranged such that each thereof receives reverse-emitted light from a corresponding one of said diode-lasers;

an application-specific integrated circuit, said integrated circuit including a plurality of sub-circuits each one thereof in electronic communication with a corresponding one of said photodetectors and said diode-lasers, each one thereof including a reference current generator individually calibrated by calibration data characteristic of said corresponding diode-laser and a desired nominal output power required to be delivered by all said diode lasers, and a drive current generator for supplying drive current to said corresponding diode-laser;

wherein each of said sub-circuits is arranged to monitor current provided by the photodetector in response to reverse-emitted light received thereby from the diode-laser, compare the monitored photodetector current with a reference current provided by said reference current generator and, from said current comparison, adjust said drive current generator such that a first current supplied thereby to the diode-laser causes the diode-laser to emit about said nominal output-power in the forward direction; and wherein said application-specific integrated circuit is spaced apart from said photodetector array by less than about 10 millimeters.

17. The diode-laser array module of claim 16, wherein there are 50 diode-lasers in said diode-laser array, 50 photodetectors and in said photodetector array and 50 sub-circuits in said application-specific integrated circuit.

* * * * *